United States Patent
Russell et al.

(10) Patent No.: US 11,308,500 B1
(45) Date of Patent: Apr. 19, 2022

(54) SYSTEMS AND METHODS FOR IDENTIFYING DEVICES AS AUTHORIZED

(71) Applicant: UIPCO, LLC, San Antonio, TX (US)

(72) Inventors: Ryan Thomas Russell, The Colony, TX (US); Gregory Brian Meyer, San Antonio, TX (US); Steven Michael Bernstein, San Antonio, TX (US); David Ira Waters, Jr., San Antonio, TX (US); Patrick Michael Luberus, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/917,084

(22) Filed: Jun. 30, 2020

(51) Int. Cl.
*G06Q 20/40* (2012.01)
*G06Q 20/42* (2012.01)
*G06Q 20/32* (2012.01)
*G06Q 40/02* (2012.01)

(52) U.S. Cl.
CPC ..... *G06Q 20/4016* (2013.01); *G06Q 20/3223* (2013.01); *G06Q 20/425* (2013.01); *G06Q 40/02* (2013.01)

(58) Field of Classification Search
CPC .................................................. G06Q 20/4016
See application file for complete search history.

(56) References Cited

U.S. PATENT DOCUMENTS

| | | | | |
|---|---|---|---|---|
| 10,503,888 | B2* | 12/2019 | Spencer, III | H04W 12/06 |
| 2011/0313861 | A1* | 12/2011 | Lawrence, III | H04L 67/20 |
| | | | | 705/14.66 |
| 2015/0106202 | A1* | 4/2015 | Bastaldo-Tsampalis | |
| | | | | G06Q 30/0257 |
| | | | | 705/14.55 |
| 2015/0278805 | A1* | 10/2015 | Spencer, III | G06Q 20/3274 |
| | | | | 705/44 |
| 2017/0011382 | A1* | 1/2017 | Zoldi | G06Q 20/382 |

FOREIGN PATENT DOCUMENTS

CN 107316197 A * 11/2017 ........... G06F 21/562

OTHER PUBLICATIONS

"Gupta, Payas, Exploiting Human Factors in User Authentication, 2013, ProQuest, abstract and pp. 64-65" (Year: 2013).*

* cited by examiner

*Primary Examiner* — Olabode Akintola
*Assistant Examiner* — Adam Hilmantel
(74) *Attorney, Agent, or Firm* — Plumsea Law Group, LLC

(57) ABSTRACT

A system and method for authenticating a user's computing device that has submitted a request for the transfer of funds from the user's account at a financial institution. An authentication server at the financial institution compares currently received identifying data to previously stored identifying data, then makes a determination as to whether to approve the request for the transfer of funds. The identifying data may include a snapshot of apps or of lists of items installed on the user's computing device.

20 Claims, 10 Drawing Sheets

SYSTEMS AND METHODS FOR IDENTIFYING DEVICES AS AUTHORIZED

TECHNICAL FIELD

This disclosure relates to systems and methods for authenticating that a transaction is being requested from an authorized device.

BACKGROUND

Financial institutions such as banks, savings and loans, credit unions, investment firms and other types of institutions generally have a strong interest in protecting their customers' or clients' financial or other assets. The customers or clients often prefer to conduct their financial business from remote locations using their own personal devices such as their smart phones, tablets, laptops or desktop computers, for example. Financial institutions typically require the customers or clients to protect access to their accounts by entering passwords, for example. However, in some cases malevolent actors intent on defrauding the customer or client may somehow obtain the customer's or client's password. Such an actor may then use the password to transfer funds or other assets from the customer's or client's account to the malevolent actor's accounts, for example.

For these reasons, there is a need for financial institutions to take additional measures when it is practical to do so in order to protect their customers or clients.

SUMMARY

Embodiments includes a system for supplementing the authentication of a transaction request submitted to a financial institution that includes a communications device for receiving fund transfer requests from the customers' computing devices. The communications device also receives identifying data from the computing devices. The system includes an authentication server housed at the financial institution that has a historical database with data relating to the financial institutions' customers' computing devices and a rules database populated with rules associated with customers' accounts at the financial institution. The communications device transmits the fund transfer requests and the identifying data to the authentication server housed at the financial institution. The authentication server also has an analyzer for analyzing the identification data received from the customers' computing devices and comparing that data to previously stored corresponding historical data. The analyzer is configured to apply the customers' user rules to determine whether fund transfer requests should be approved.

In another aspect, embodiments include a method for further authenticating a computing device that submits a transaction request to a financial institution that includes receiving the transaction request from the computing device. The financial institution then requests additional identification data of apps that are installed in the computing device. The financial institution also receives the identification data and compares the received identification data to previously stored identification data. It then determines whether the received identification data is a match to the previously stored identification data, and approves the transaction request if the received identification data is a match to the previously stored identification data.

Embodiments further include a computing device that includes a financial institution app associated with a financial institution. It also includes a list of additional apps appearing on the display of the computing device. The display also includes a group of apps on the computing device, and at least one folder that contains at least one list of items selected by a user of the computing device. The financial institution app is configured to transmit data relating to at least one of the display of the group of apps, the configuration of apps on the display and the folder that contains a list of items selected by the user of the computing device to a remote server at the financial institution in conjunction with a transaction request relating to an account at the financial institution associated with the user.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings like reference numerals designate corresponding parts throughout the drawings.

DESCRIPTION OF EMBODIMENTS

Figure 1A:
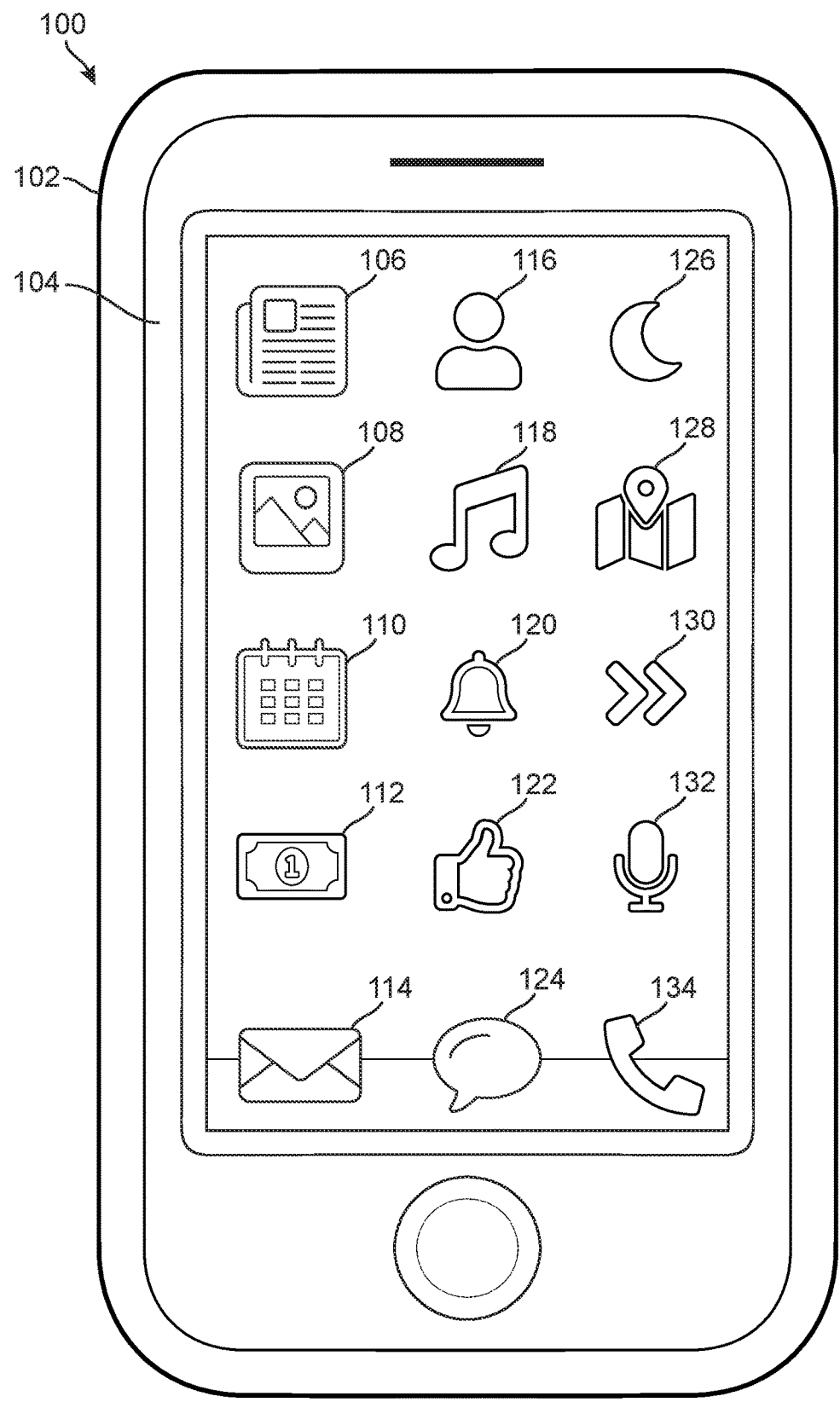
FIG. 1A is a schematic diagram of a smart phone with applications on its home screen display.

The embodiments disclosed herein provide systems and methods for supplementing the identification of a remote computing device requesting a transaction from an account at a financial institution, such as a request to transfer funds from an account at the institution. These embodiments serve to supplement and strengthen the authentication of a transaction request in addition to the typical username and password required by financial institutions for online banking. The method includes comparing current data and applications and their configurations on the display of the user's current computing device to such previously stored data and applications from the user's authorized computing device. The method requires first verifying the user's identity and then collecting information about the user's authorized computing device.

As used herein, the terms "financial institution" and "bank" are used interchangeably to include banks, savings and loans, credit unions, investment firms, stock brokers, financial planners, and other such organizations. The term "customer" and "client" are used interchangeably to include any individual or entity conducting business, financial transactions, or other such transactions with a financial institution such as above. The term "computing device" shall include smart phones, tablets, notebook computers, laptops and desktop computers. The term "transaction request" shall include requests for the transfer of funds, requests for the sale or purchase of stocks, bonds or other kinds of investments, as well as other financial transactions. The term "group of apps" refers to all the apps that are displayed on the screens on a smart phone, tablet or other computing device. The term "home group" refers to all the apps that are displayed on the smart phone's or other computing device's home screen. The term "snapshot" of a computing device refers to the characterization of the state of the computing device, including a list of the apps and other functionalities on the computing device.

The apps installed on a computing device such as a smart phone, tablet, laptop or other computing device may be collectively referred to as the "group of apps." Thus the term "group of apps" will refer to the apps installed on the computing device and displayed on the screen of the computing device. The group of apps may be displayed on multiple screens, with a first set displayed in a first particular configuration on the computing device's home screen, a second set displayed in a second particular configuration on a second screen, a third set displayed in a third particular configuration on a third screen and so on. The specific arrangement of the apps on the different screens may then be used to identify and authenticate a computing device submitting a transaction request to a financial institution.

In some embodiments, the identification of the user's computing device may be a characterization of the state of the computing device's system at a particular point in time. This characterization may be referred to for convenience as a "snapshot" of the apps and other functionalities operating on the computing device. The collected information may include a list of the user's applications, data specific to those applications (such as web browser bookmarks or music playlists within a music folder), descriptions of where the apps are located in the computing device, the positions of the various apps on the computing device when they are displayed on the computer device's screen or other such data. For example, this information could be stored along with other account information on a bank server as an authenticated identification of the user's device. When the user attempts to initiate a transaction on this remote server, the authenticated identification or snapshot may be used to verify whether the user's current device is an authorized device. If it is not determined to be an authorized device, the transaction may be denied by the bank or financial institution.

Users of computing devices who have many apps installed on their devices may have apps that the users may have selected and installed on their computing devices, in addition to apps that were pre-installed in the computing devices when the computing devices were first acquired (such as word processing, security, calculating and browsing apps, for example). The selected apps and the pre-installed apps form a group of apps installed on the computing device and shown on the computer device's display screen.

To account for frequent changes in applications and other data on a user's device, the system may determine an authentication score based on the similarity of the current applications and/or other data compared to the previously authenticated identifying applications and/or other data. That score could then be used to supplement other conventional authentication factors to determine if a particular transaction should be approved.

For example, many users of computing devices such as smart phones have a strong preference for which apps to install on the computing devices, and may even have a preference for the particular configuration of the apps on the computing devices screen. Those users then likely will retain their apps when they replace their computing devices with a new computing device, and may also require the apps to be displayed with the same configuration—that is in the same order and in the same position—on the computing device's display. In that case, there would likely be a full match between a currently received set of identification data and the historical set of identification data that had been previously been stored for comparison with received identification data. The comparison of currently received identification data to historical identification data may then be used to verify the authenticity of the computing device used to submit a transaction request.

In some cases, the new phone may carry the same apps, but the apps may not be displayed with exactly the same configuration or the same sequence. In those cases, the match may not be a full match, but it might be classified as a fairly strong partial match. The comparison of the current identification data to the historical identification data would then like result in a relatively high indication of authenticity. In that case, the user may have established a rule that would allow some transactions, but might also limit the transactions for this particular partial match, for example by setting maximum monetary limits on withdrawals or payments from a bank account.

In other cases, the user of the computing device may only have a strong preference as to which apps appear on the initial display shown on the computing device when it is first activated. Thus in those cases, the comparison of currently received apps to historical apps would likely show a full match for the home group of apps shown on the home screen, but only partial matches for apps shown on subsequent screens. In these cases, the comparison of currently received apps to historic apps would only be a partial match. This partial match may be considered to be a fairly weak match than the partial match described in the preceding paragraph, since there would be differences in the apps displayed on subsequent screens of the smart phone, tablet or other computing device. In that case, the user may have established somewhat stricter rules compared to the rules governing requests for the partial match described in the preceding paragraph, for example by establishing somewhat lower monetary limits on withdrawals from the bank account.

FIG. 1A is a schematic diagram 100 illustrating a computing device—in this example a smart phone 102. Smart phone 102 has numerous applications displayed on its home display 104. In this example, the displayed apps include a news app 106, a photos app 108, a calendar app 110, a banking app 112, an email client 114, a user settings app 116, a music player app 118, a reminders app 120, a social media app 122, a text-messaging app 124, a sleep settings app 126, a map app 128, a web browser app 130, an audio recording app 132, and a phone app 134. While some of the applications are stock applications that come factory-installed on the phone, others are chosen by and installed by the phone's user. The group of apps on any given smart phone may be specific to that individual device, and for that reason may be used as an identifying marker of the device, distinguishing it from other devices.

As noted above, many users of smart phones, tablets and other computing devices may have a strong preference for the group of apps on their devices, such that they prefer to keep the same apps, the same playlists and web browser bookmarks, for example, when they replace their current devices with newer models. Thus, they may not need to make any changes in the user rules (described below) when they replace their current devices. In other cases, the users may add or delete certain apps from their devices, whether or not they are replacing a current device with a newer one. In that case, the users may update the historical identification data to reflect the changes. If the users do not do so, then their computing devices would be found to only have partial matches to the historical data, likely limiting the extent of any financial transaction they may wish to submit to their financial institution from a remote computing device.

Figure 1B:
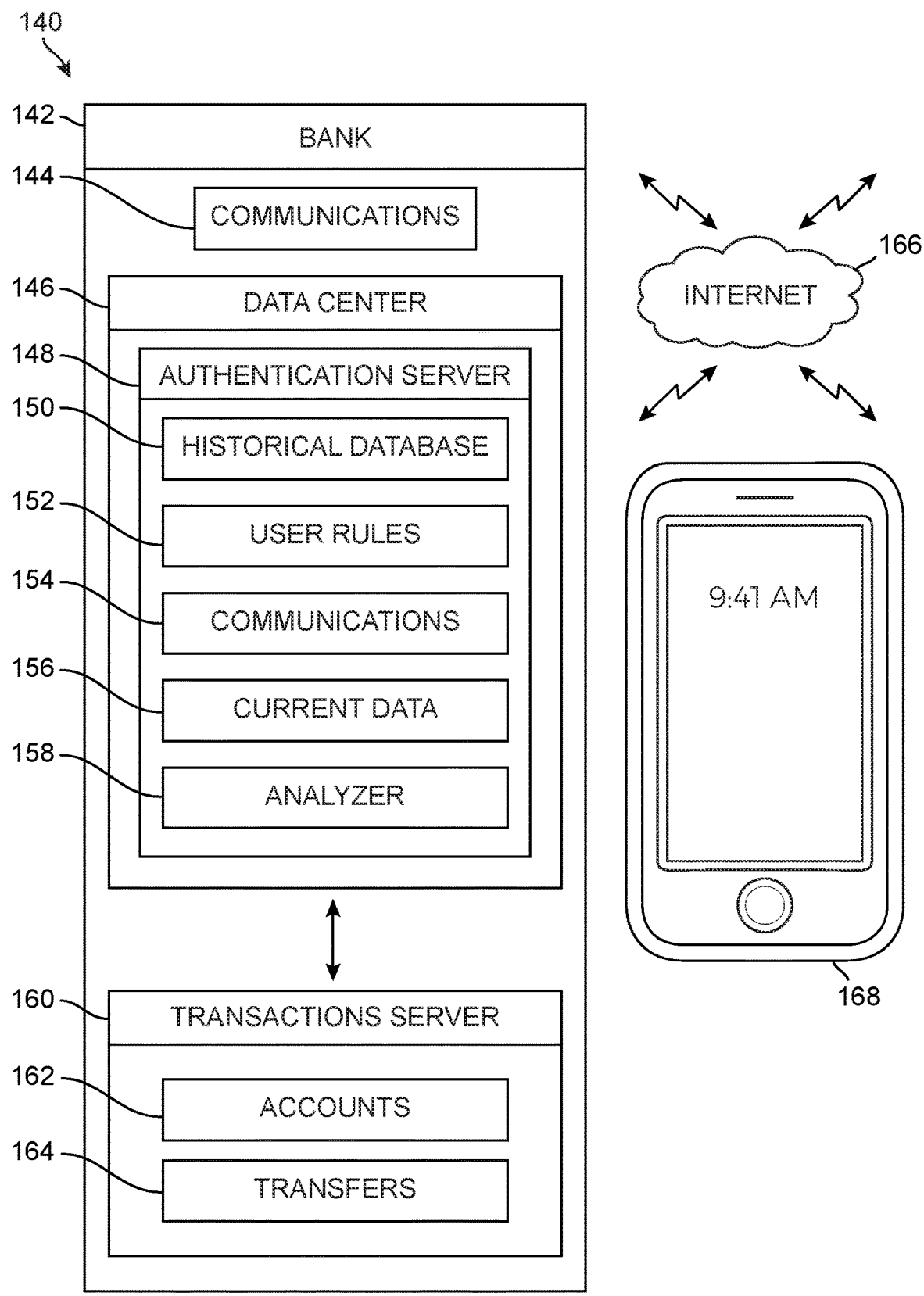
FIG. 1B is a schematic diagram illustrating a bank in communication with a smart phone over the Internet, in an embodiment.

FIG. 1B is a schematic diagram 140 illustrating an apparatus that may be used to authenticate an attempt by a smart phone 168 to access an account at a bank 142 via Internet 166. Bank 142 has a communications device 144 that receives transactions requests from remote computing devices such as smart phone 168 and transmits those requests to authentication server 148 in data center 146. Authentication server 148 includes a historical database 150 of users' names and their associated data. In this example, data center 146 houses authentication server 148 and transaction server 160, and may house several other servers as well. Examples of such associated data may include, for example, the Mobile Device Identifier (MDI) or the Mobile Identification Number (MIN) of a user's smart phone, or a MAC address for a laptop or desktop computer, the phone numbers of smart phones or tablets, and so on. Historical database 150 may also include previously stored data relating to the group of apps, including apps such as music apps and their playlists, health apps, weather apps, web browser bookmarks and news apps and many other apps, for example, to the configuration of apps on a display. Other personal data stored on users' computing devices may also be used to authenticate the customer, as explained below.

Authentication server 148 also includes a database of user rules 152 for each account at the bank. These accounts are located in an accounts database 162 on transactions server 160. Authentication server 148 also has a communications module 154 that controls communications into and out of authentication server 148, such as communications with transactions server 160. Authentication server 148 also contains an analyzer 158 configured to compare data currently received from a remote computing device and stored in current data database 156 to corresponding data previously stored in the historical database, to apply user rules 150 to analyze the potentially authenticating data. In some embodiments, this analysis may be used to convert the authenticating data into a numerical score. The authentication data may include identification of apps in the group of apps installed and displayed on the smart phone's screens. The results of the analysis (a numerical score or some other result) can then be used by the analyzer to approve or deny a requested transaction according to the specific user's rules (which are stored in the user rules database 150). Transactions server 160 has an accounts database 162 storing the customers' accounts and a transfers app 164 that executes transfers into and out of the accounts at the bank.

In this embodiment, after communications module 144 routes the request to authentication server 148, authentication server 148 then checks the user rules in user rules database 152 to determine whether the requested transaction requires device authentication. If none is needed, the request may be approved. If the request requires authentication of the requesting device, authentication server 148 retrieves a historical identification data (for example, the group of apps operating on the computing device) of the purported requesting device from the historical database 150. It may also retrieve other factors (described below) from historical database 150. The identification data may include data that is highly specific to smart phone (or other computing device) 168 and could include lists of apps on smart phone 168, playlists, bookmarks, or other personal data. In some embodiments, the authentication server receives a current identification of the group of apps or other identifying data on the initiating computing device such as a smart phone to compare to the group of apps or other identifying data sent by the computing device transmitting the transaction request. Algorithms in analyzer 158 may then calculate an authentication score that may serve as a numerical representation of the extent of the match between the historical data and the current data. Analyzer 158 then authorizes or denies the request, as described below.

Although the descriptions in the preceding paragraphs refer to an authentication server housing a historical database, a user rules database and a current data database, and also refer to a transactions server housing an accounts database and a transfer app, these apps and databases may be housed in the same server or separately in different servers, or in any other combination or configuration of servers and apps within data center 146.

Although the descriptions of embodiments herein focus on smart phones, the disclosure applies to any type of computing device that has a processing unit, a display, means for entering data or downloading data (such as music, video, or audiobooks, for example), means for downloading apps into the computing device, and at least one communications module for accessing a server or other device at a remote institution, such as a financial institution.

Figure 2:
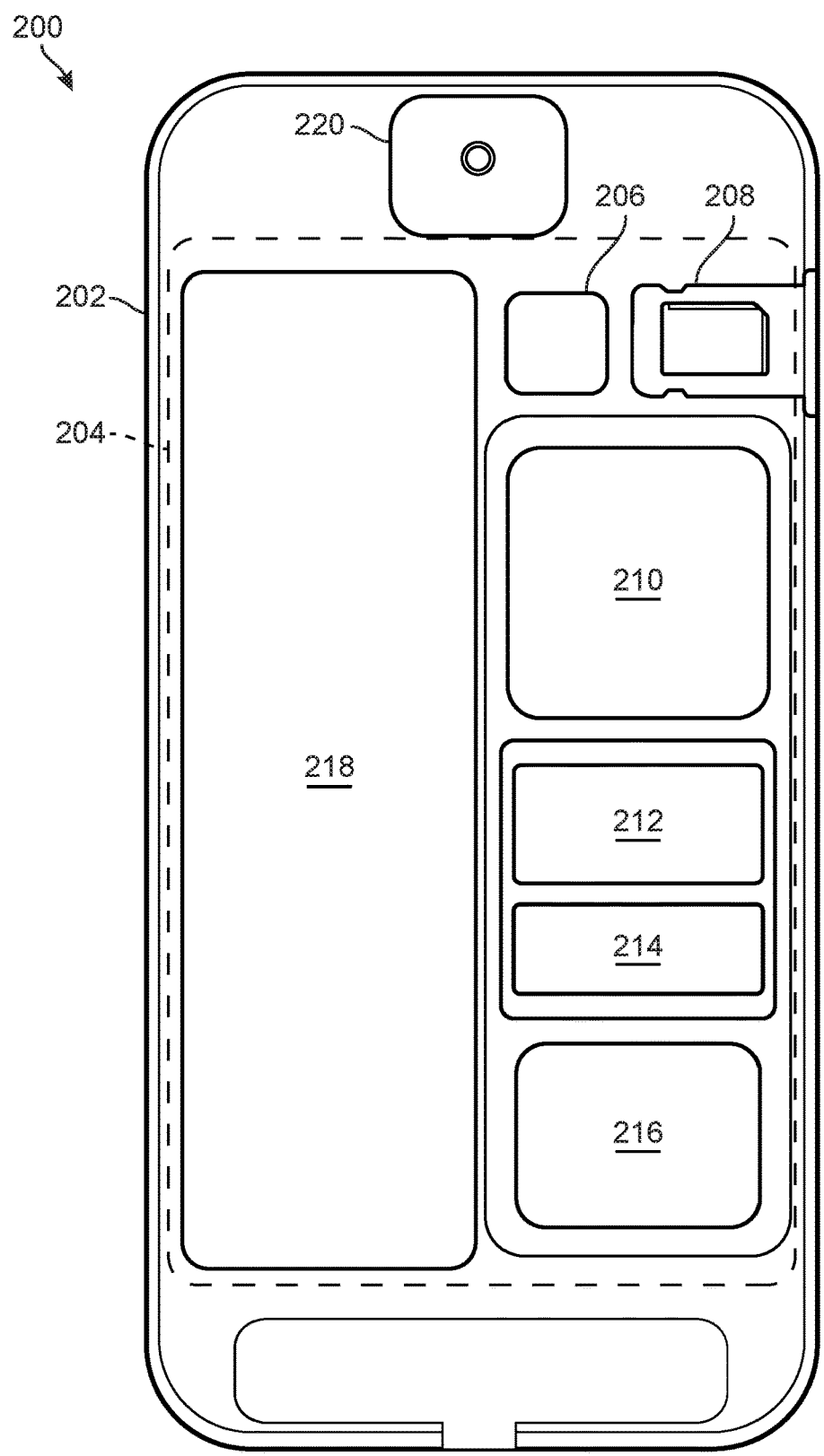
FIG. 2 is a schematic diagram showing components of a smart phone.

FIG. 2 is a schematic diagram 200 of common components of a smart phone 202. Smart phone 202 includes a display 204. Display 204 displays applications and data stored on smart phone 202. Smart phone 202 additionally includes a GPS component 206. Smart phone 202 includes a subscriber identity module (SIM) 208 with which smart phone 206 registers on cellular/data networks. In some embodiments, SIM 208 also serves as an identifying means with which to associate smart phone 202 with a particular user who has an account on a remote server.

Smart phone 202 includes a processing unit 210 which acts as a control module for the components of mobile device 202, including display 204 and camera 220. Smart phone 202 includes a connection module 212. Connection module 212 is associated with wired connections to smart phone 202, for example, for charging smart phone 202 or for making a wired connection between smart phone 202 and another device.

Smart phone 202 includes a memory 214. Memory 214 stores a variety of data and applications, including preloaded applications and data that would be common to all users of such a device and applications and data that have been stored in the course of regular use of smart phone 202 by a particular user and are thus characteristic of the particular user of smart phone 202. Smart phone 202 includes communications module 216. Communications module 216 executes wireless communications (such as Wi-Fi, Bluetooth, near field communication (NFC) technologies, and communications over the Internet) between smart phone 202 and other devices, servers, and databases. Communications module 216 thus functions as a link between a remote server seeking to analyze characteristic apps and data stored on smart phone 202. Mobile device 202 includes a battery 218 and a camera 220. Battery 218 provides the power source for mobile device 202. In some embodiments, which allow a remote server to access pictures taken by camera 220 and stored in memory 214, such data would provide highly specific information that would establish the identity of smart phone 202.

Figure 3:
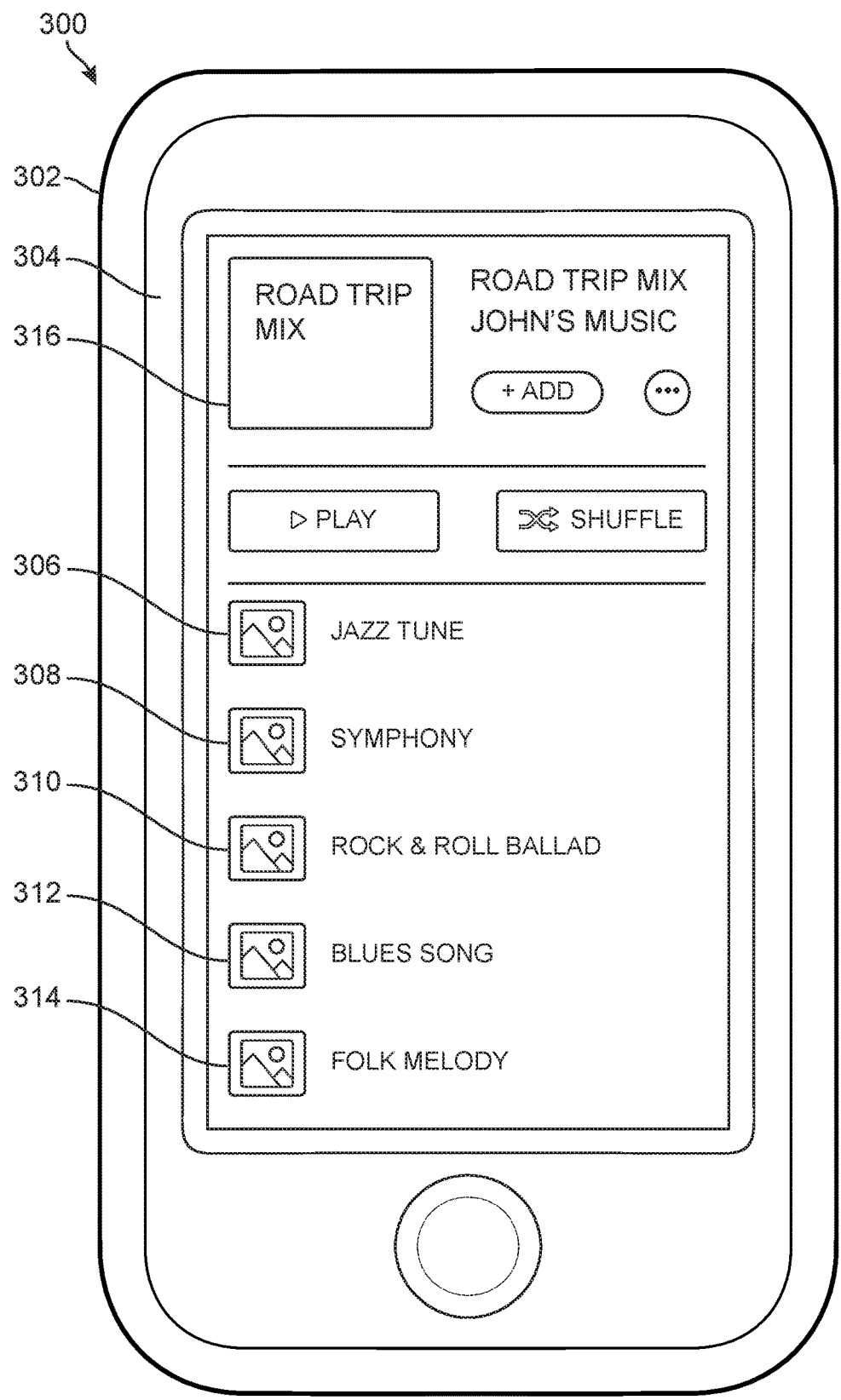
FIG. 3 is a schematic diagram of a display on a smart phone showing a playlist.

FIG. 3 is a schematic diagram 300 of a mobile phone 302 with a music player app open on its display 304. The app contains a playlist 316 that consists of a list of various songs that is likely unique to that particular playlist. The first song 306 represents an example of a jazz song. The second song 308 represents an example of a symphony. The third and fourth songs represent a rock and roll ballad 310 and a blues song 312, respectively. The last song 314 represents an example of a folk melody. The examples are intended to represent specific musical recordings which users may download and listen to on their smart phones. The unique combination of songs and their order in the playlist is specific and likely unique data that may be used as another identifying marker of device 202, distinguishing it from other devices.

Figure 4:
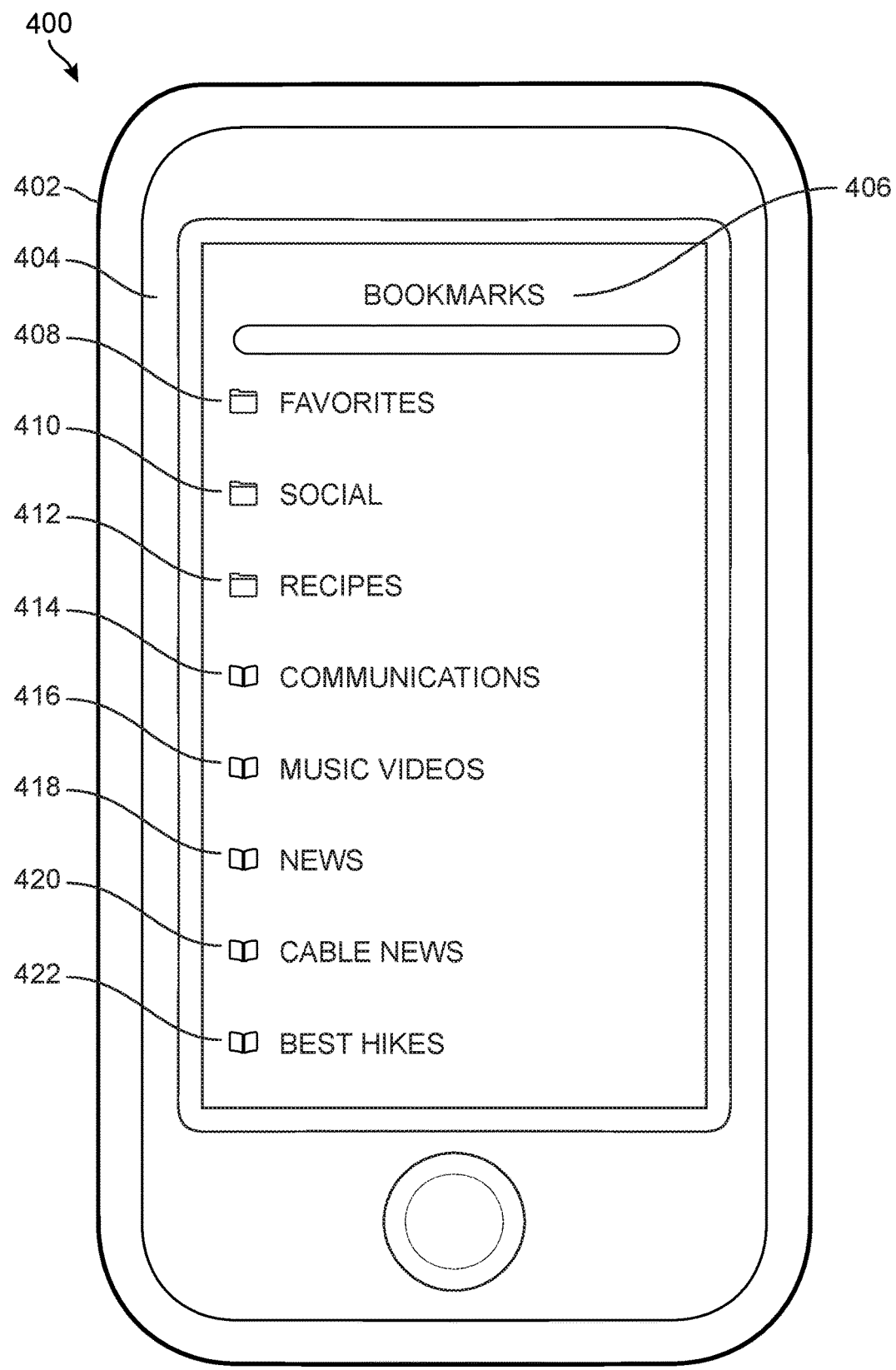
FIG. 4 is a schematic diagram of a smart phone showing web browser bookmarks.

FIG. 4 is a schematic diagram 400 of an example of a mobile phone 402 with a web browser application open on its display 404. The web browser has a list of website bookmarks 406 that was created by the user. The bookmarks include a favorites folder 408 which includes another list of "favorite" websites, a social folder 410 which includes another list of "social" websites, and a recipes folder 412 which includes another list of "recipe" themed websites. Bookmark 414 is a link to an exemplary communications website, such as a mobile phone or an Internet provider's homepage. Bookmark 416 is a link to an exemplary music video website, such as a website which features popular music videos. Bookmark 418 is a link to an exemplary news website, such as a daily newspaper. Bookmark 420 is an exemplary link to a cable news website, such as a cable news broadcaster's homepage. Bookmark 422 is a link to an exemplary website that provides maps of hiking trails. These examples are intended to represent specific websites which a user may bookmark on their smart phones. The unique combination of websites, folders, and the sites within those folders is specific and unique data and can be used as another identifying marker of the user's authorized device, distinguishing it from other devices.

Although the descriptions of FIG. 3 and FIG. 4 relate to specific examples of items that may be used to identify a smart phone, embodiments apply more generally to other types of computing devices as that term is defined above. Moreover, although the descriptions of FIG. 2, FIG. 3, and FIG. 4 relate to specific types of data stored within smartphones, such as the group of apps displayed on the smart phone's screens, the embodiments may use other such types of data stored within any computing device or its apps or applications.

Also, as noted above, many users of computing devices will download and install the same apps on replacement devices. For example, purchasers of new devices typically install all of the apps and other functionalities that were present in their previous devices into their new devices. In those cases, the new devices would likely continue to receive the same authentication confirmations as did the previous devices.

Figure 5:
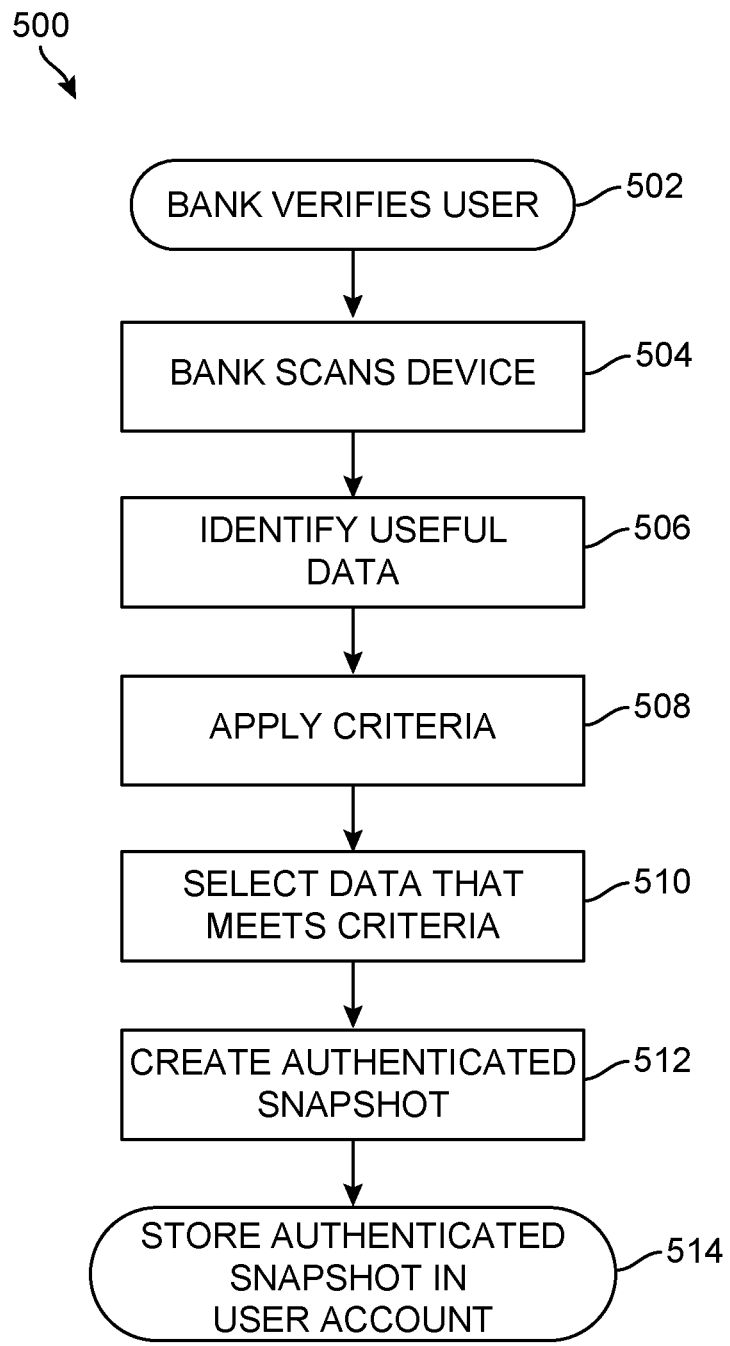
FIG. 5 is a flowchart of a process by which a financial institution may create an authenticated snapshot of a user's device, in an embodiment.

FIG. 5 is a flowchart 500 of an example of a process by which a financial institution may create identification data such as an authenticated snapshot of a user's device. In this example, the "snapshot" would be a characterization of the state of the computing device at the time the process illustrated in FIG. 5 started. Thus the snapshot may include all of the apps installed in the computing device—both those that appear on the display of the computing device and those that are not shown on the display. The snapshot may also include the location on the display of the computing device where those apps are displayed. In step 502, a remote server, such as the authentication server shown in FIG. 1B, associated with the financial institution verifies the user's identity. In some embodiments, such verification could include the use of one-time passwords sent to a phone number associated with the account, biometric identification, use of biographical information associated with the account, or some combination of these verification steps. In step 504, the authentication server scans the verified user's device. In some embodiments, to perform this scan, the remote server asks the user to identify folders or applications on the device to scan. In some embodiments, the remote server automatically scans all of the data stored on the user's device to identify the group of apps that would contain characteristic, user-specific information—including, for example, folders named "photos" or "music" or apps associated with webbrowsing. The remote server then uploads a copy of the stored identification data to its historical database for further analysis.

In some embodiments, the authentication server has established a set of criteria, referred to below as "specificity criteria" to single out the most user-specific sets of data from the entirety of the data that has been uploaded to the server. In this embodiment, such criteria must balance overall information content with user-specificity. For example, a photograph stored on the user's device is essentially unique but may require a large amount of bandwidth and storage, whereas a frequently visited world wide web address could be very specific to the user of the device and require much less server resources to process.

In those embodiments, algorithms running on the authentication server first selects low information content data, analyzes its user-specificity based on the rarity of such data on similar such user devices, updates a "total specificity" score and then moves on to analyzing higher and higher information content data until the specificity score reaches a certain threshold. That threshold could be defined by the user or by the bank. In some embodiments, the authentication server seeks highly specific, low information content data when scanning the user's device, uploads it, calculates the total specificity score, then uploads more data until the total specificity score meets the threshold value. Note that such "sets of data" might have some common association with each other—for example, the entirety of a database containing bookmarks for a web browsing app, a specific playlist associated with a music app, or a list of apps stored in a specific configuration on the user's device. This allows the authentication server to, at a later time, efficiently recall such data from the user's device even if the contents of the database or folder have changed slightly.

In step 506, the authentication server identifies which data from the uploaded data is the most useful data for the purpose of distinguishing the user's device from other devices. In some embodiments, the identification process includes selecting data of certain file types (such as mp3, jpeg or txt, for example). In step 508, the authentication server then applies the specificity criteria previously established by the authentication server. In step 510, the authentication server selects the data that meet those criteria. In some embodiments, the authentication server first selects for analysis the lowest information content sets of data, and then successively analyzes more data until a continually updated total specificity score meets a defined threshold. In some embodiments, the authentication server deploys an algorithm to minimize the total information content of the complete subset of data that is required to meet the threshold for the total specificity score in selecting this subset. In some embodiments, if the algorithm does not recognize a particular set of data and thus cannot assign it a contribution to the total specificity score, it skips that set of data.

In step 512, the authentication server then identifies the subset of the uploaded data the algorithm has determined meets the threshold for the total specificity score. In step 514, the authentication server stores this subset in its memory, along with how the subset is stored on the user's device (for example, a folder name), to be associated with the user's account, as an "authenticated snapshot" of the user's device In the example shown in FIG. 5, the identifying data is shown as a snapshot, but in other embodiments the identifying data may be other types of data that may be used to identify the computing device submitting a request to the financial institution.

Figure 6:
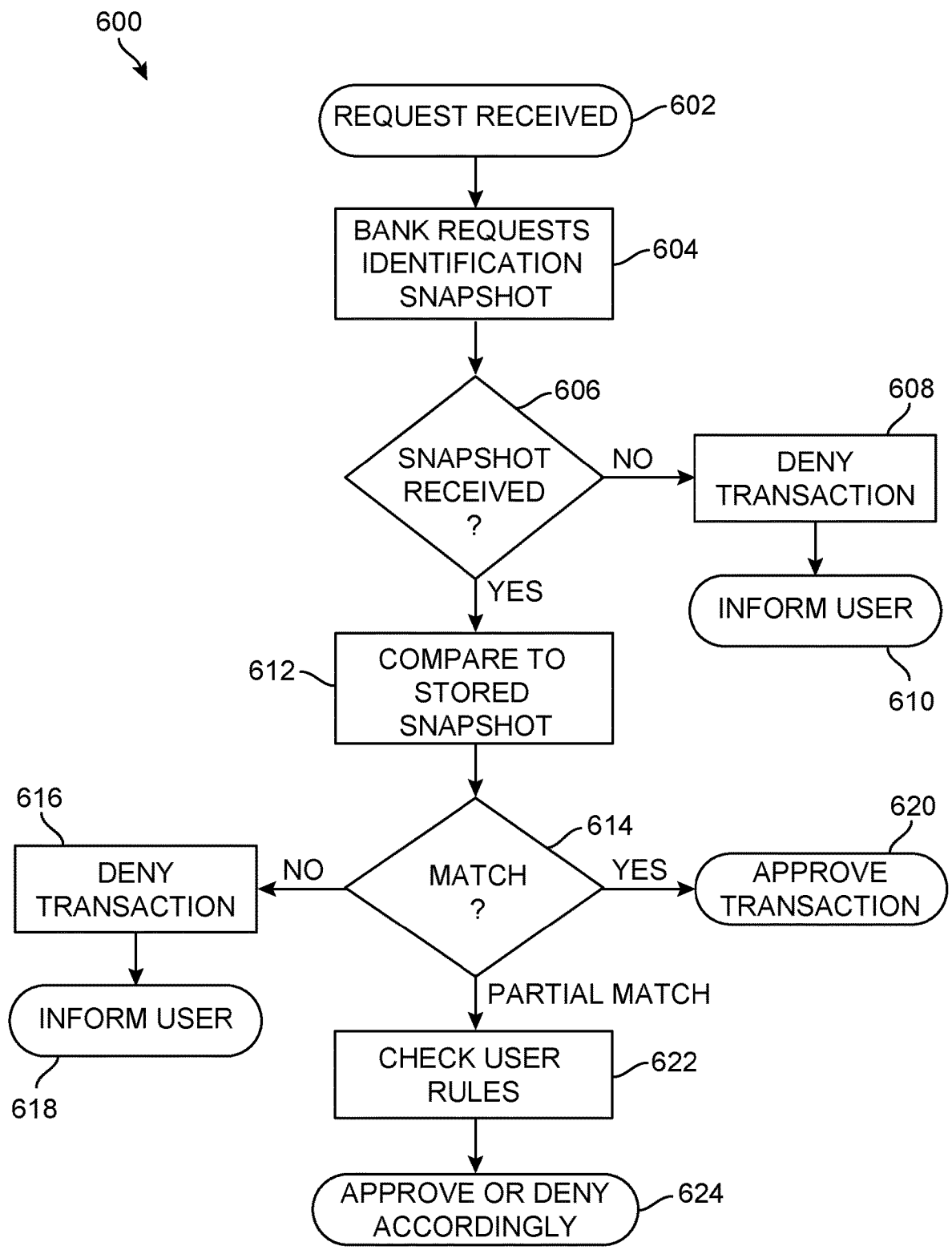
FIG. 6 is a flowchart of a process for using a stored authenticated snapshot to authenticate the user's current device, in an embodiment.

FIG. 6 is a flowchart 600 of a process that shows how a financial institution may use the stored authenticated identification data to verify whether the user's device matches one of the user's authorized devices. At step 602, a bank receives a request for a transaction relating to an account with the bank, such as a request to transfer funds to a payee, or some other financial request. In some embodiments, a server associated with the bank checks a policy attached to the account to see if device verification is required to undertake the transaction and only undertakes the following processes if such device verification is required. At step 604, in this embodiment, the bank requests identification data such as a snapshot from the user's device, or an identification of a group of apps. In this embodiment, the bank's server identifies the association between the data stored as the authentication snapshot (in many cases, this may be data stored in a specific folder on the user's device) and sends a request to the user's device for that data set. At step 606, the bank checks whether this device snapshot, identification of the apps in the group of apps for this device, or other identification data is received. At step 608, the bank will deny the transaction if the data is not received. The process may end at step 608, but in some embodiments, the bank may then notify the user that the bank could not authenticate an attempted transaction at step 610. If the device snapshot, identification of the apps in the group of apps or other identifying data is received, then at step 612, the bank compares it to the stored authenticated snapshot, apps in the group of apps or other identifying data that was created earlier by the process described with reference to FIG. 5. At step 614, the bank checks if there is a match. If there is a match, the bank approves the transaction at step 620.

If the current device snapshot, identification of the apps in the group of apps or other identifying data and the stored historical snapshot, identification of the apps in the group of apps, or other identifying data do not have a significant number of common elements, then the bank will deny the transaction at step 616. The process may then end at step 616, or in some embodiments, the bank may inform the user at step 618 that it could not authenticate the attempted transaction. If instead of a complete match, there is only a partial match, then at step 622 the bank checks the user's rules for partial matches. Examples of user rules for partial matches are described below with reference to FIG. 7. According to the user's rules, the bank will either approve or deny the transaction accordingly at step 624. In some embodiments, if the transaction is denied, the bank may give the user the option of verifying his or her identity by other methods, and thus authenticating the transaction.

Figure 7:
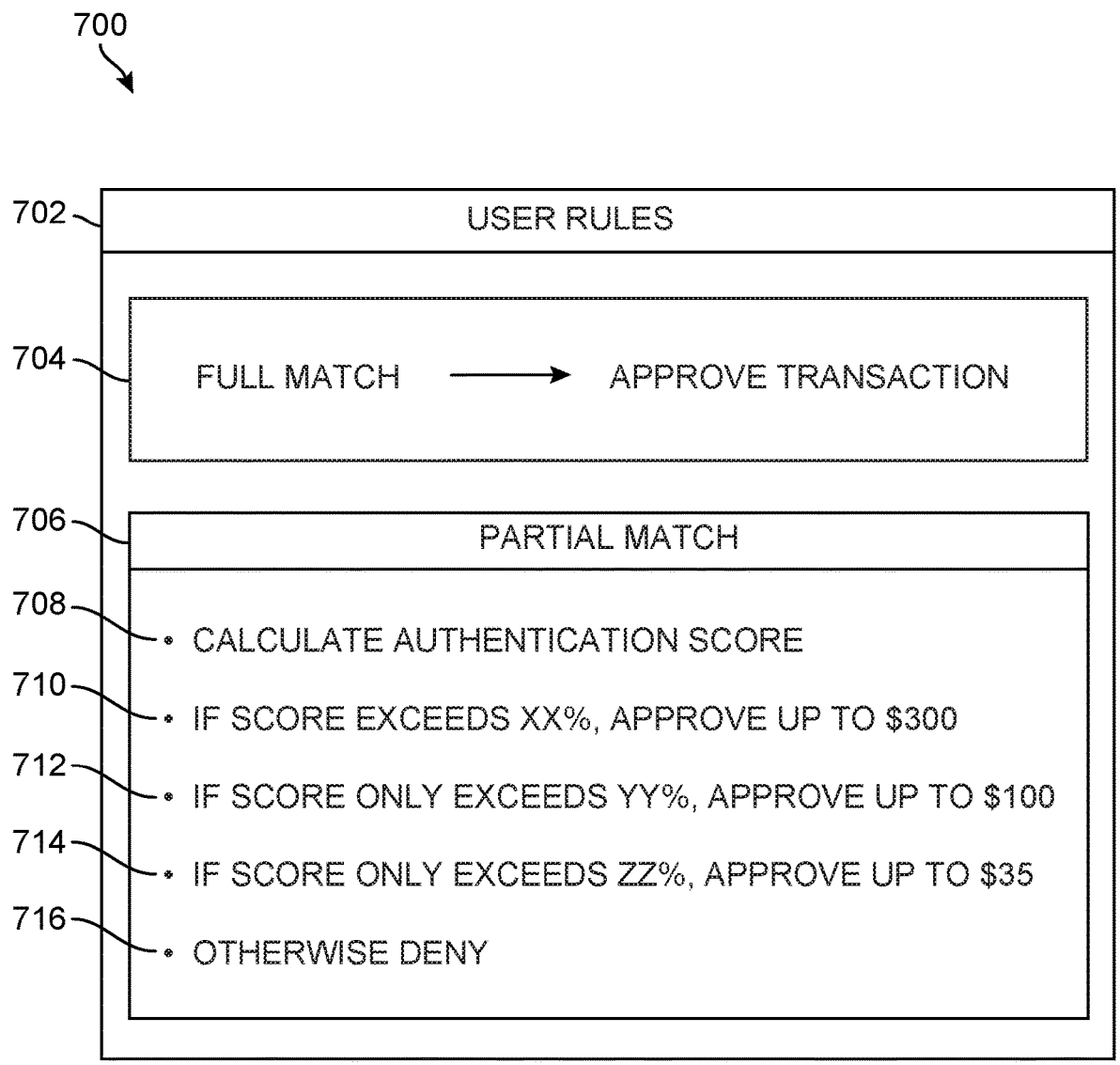
FIG. 7 is a chart illustrating examples of user rules for allowing or denying proposed transactions, in an embodiment.

FIG. 7 is a chart 700 illustrating examples of a user's rules 702 for which transactions may be allowed based on the extent of the match between the user's current device snapshot, identification of the apps in the group of apps, or other identification data and the user's stored authentication snapshot, identification of the apps in the group of apps, or other identification data for the computing device submitting the request. Rule 704 applies if the user's current device snapshot or other identification data fully matches the stored authenticated snapshot or identification data. In that case, the transaction is approved, and the transaction is executed without requiring any further actions by the user. If there is only a partial match, then one of the rules in set 706 applies. In that case, for example, rule 708 would require the calculation of a score which represents the extent of the match between the current device snapshot and the stored authentication snapshots. This score is referred to in FIG. 7 as an "authentication score". An embodiment discussing the calculation of the authentication score is described below with reference to FIG. 8.

If the authentication score exceeds a given "high" threshold (shown as "XX %" in rule 710), then rule 710 would specify that the bank authorize transactions up to a specified monetary value, such as $300 or some other value chosen by the user. If the authentication score exceeds only a given "medium" threshold (shown as "YY %" in rule 712), then rule 712 would specify that the bank authorize transactions up to a specified lower monetary value than would be allowed by rule 710, for example $100 or some other value chosen by the user. If the authentication score exceeds only a given "low" threshold (shown as "ZZ %" in rule 714), then rule 714 would specify that the bank authorize transactions up to a specified lower monetary value than would be allowed by rule 712, for example up to $35 or some other value chosen by the user. If the authentication score does not meet any of the above thresholds, then rule 716 would specify that the bank deny all transactions requested by the user. The above rules and thresholds could be a combination of preferences set by the user and the bank, just by the bank, or just by the user.

Although the descriptions of FIG. 7 refer to a numerical authentication score, authentication scores are not necessarily numerical. For example, an authentication score could be a classification scheme based on the results of the comparisons of current data to historical data, such as "very strong" for a full match, "strong" for a good but not a full match, "fairly strong" for a lesser match, "somewhat weak" for a somewhat weak match, "weak" for a weak match, and "very weak" for an even weaker match, for example.

Figure 8:
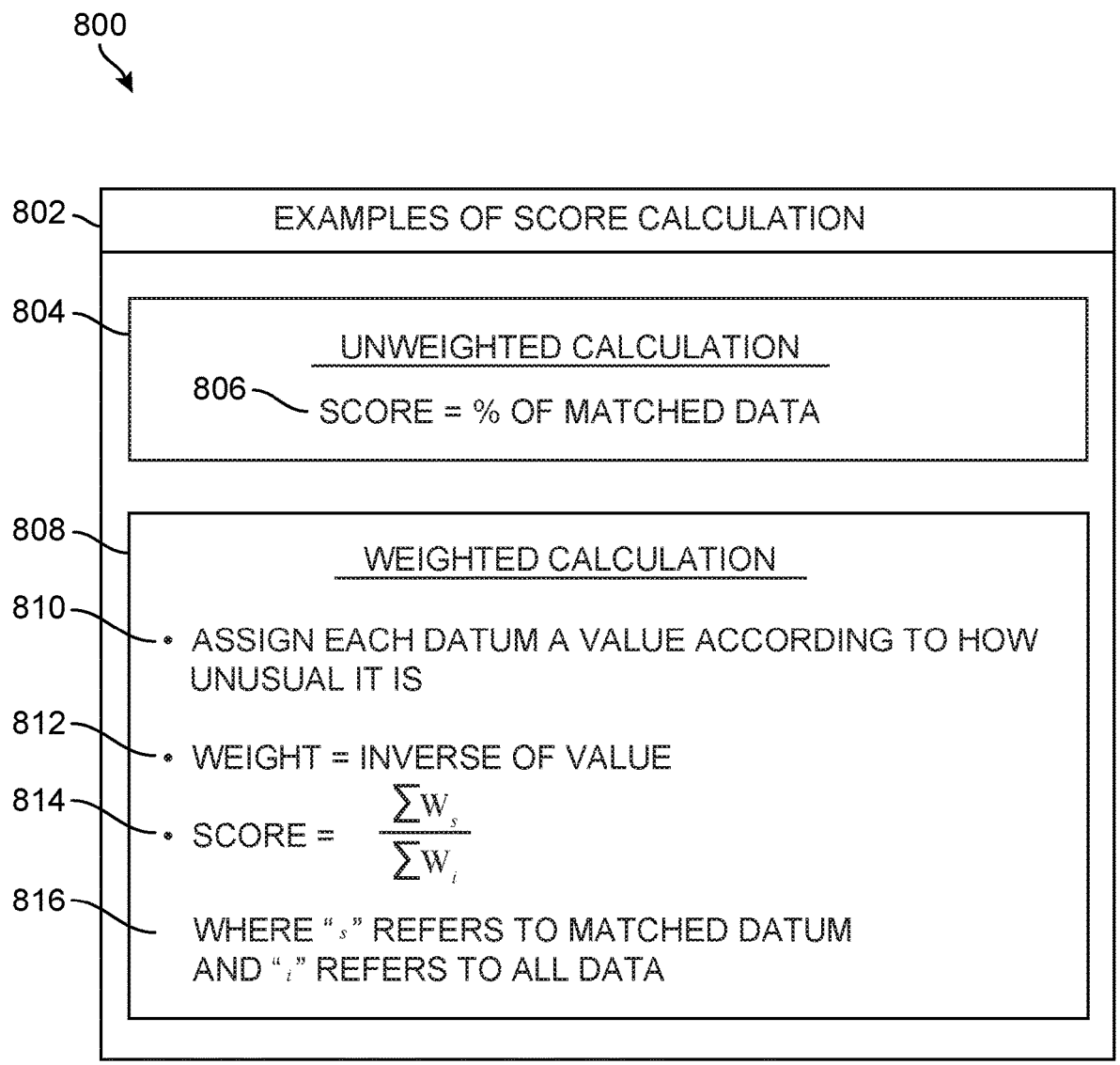
FIG. 8 is a chart illustrating examples of an authentication score calculation, in an embodiment.

FIG. 8 is a chart 800 of examples 802 of the calculation of authentication scores. Other embodiments may use different methods for this calculation depending on the desired sensitivity of the calculation, the input data, the known parameters and computing resources, for example. Other embodiments may use methods other than numerical calculations to evaluate the extent of the match. Element 804 uses an unweighted calculation 804 of an authentication score 806. Unweighted calculation 804 consists of calculating the percentage of matched elements between the authenticated snapshot associated with a user's account and the current device snapshot. In an embodiment where the authentication data consists of bookmarks in a folder associated with a web browsing application, such matching consists of determining if there is a match between the uniform resource locators (URLs) for each of the bookmarks in the authenticated data and the current device data. In an embodiment where the authenticated data consists of filenames in a media folder (for example, a folder in which music is stored) such matching consists of determining if there is a match between the filenames in the authenticated data and the currently received device data.

Charts 808 present a method for doing a weighted calculation of an authentication score. The reason for using a weighted calculation is that some identifying data in an authenticated snapshot, owing to their relative rarity, are more effective in identifying the specific device than more commonly used data. Element 810 assigns a value to each datum in the authenticated snapshot. The value may be based on an estimate of its rarity in user devices generally. In some embodiments, such estimates are derived by surveying a random collection of user devices.

An example of a partial match that would receive a relatively high authentication score would be a full match of the currently received apps in the group of apps compared to the corresponding historical apps in the group of apps, but the sequence or configurations are different. In that case, this partial match would most likely be awarded a high score. An example of a partial match that would only merit a very low score would be if most of the apps that match are commonly installed apps that may be found in a majority of people's computing devices. In that case, including additional specific data, such as a playlist or a list of web browser bookmarks, for example, would serve to significantly improve the authentication score.

Element 812 defines the weight of a datum in the identifying data as the inverse of the value assigned to that datum. Elements 814 and 816 then calculate the authentication score as the sum of the weights for each matched datum divided by the sum of the weights for all the identifying data.

Figure 9:
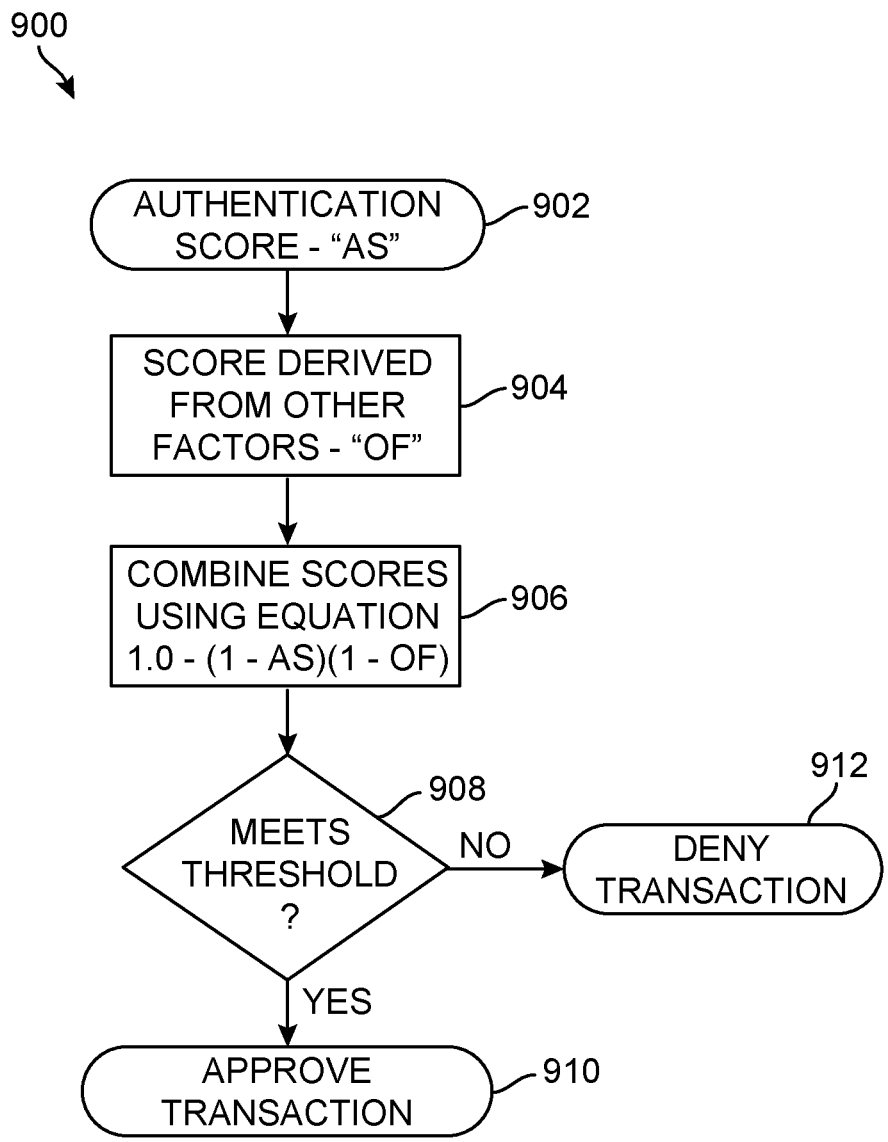
FIG. 9 is a flowchart illustrating the use of an overall authentication score to approve or deny transactions, in an embodiment.

FIG. 9 is a flow chart 900 illustrating an embodiment in which an authentication score is combined with other factors to approve or deny user-requested transactions on a remote server. In this embodiment, at step 902 an authentication score that ranges from 0 to 1 is calculated for a device requesting a transaction on an authentication server for an account that has an authentication snapshot associated with it. In some embodiments, this calculation uses one of the methods outlined in FIG. 8. At step 904, a set of other authenticating factors for the device is combined into a score which also ranges from 0 to 1, herein referred to as an "other factors score". In some embodiments, these other factors include device characteristics, device identifiers such as the Mobile Device Identifier (MDI) or the Mobile Identification Number (MIN) of a user's smart phone, or a MAC address for a laptop or desktop computer. These currently received device characteristics may be compared to the corresponding characteristics of the users' computing devices that had previously been stored in the server's historical database. Additional "other factors" may include the strength of the password associated with the account, and the location of the computing device, and other such data, for example. In one embodiment, the other factors score may also use a comparison of the make, model and generation of the requesting computing device to the make, model and generation of an authorized device associated with the account and stored in the historical database. In some embodiments, the other factors may include biometric indicators of identity, such as a fingerprint, or a view of the user's face that might be compared to a stored image of the user's face using facial recognition techniques.

At step 906, these two scores may then be combined, for example according to the formula shown in FIG. 9. In other embodiments, other formulas may be used or other processes may be used to combine the authentication score "AS" with the other factors score "OF". In other cases that use a classification scheme, the combination of two "fairly high" scores, for example, might result in an overall "very strong" final classification. At step 908, the authentication server determines if the combined score meets a predetermined threshold set by a policy associated with the account. If it does not, then at step 912, the authentication server denies the requested transaction and the process ends. If it does meet the predetermined threshold, then at step 910 the authentication server approves the requested transaction, and the process ends.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for supplementing the authentication of a transaction request initiated by and submitted by a mobile computing device associated with a customer to an authentication server computing device associated with a financial institution comprising:

a communications device configured to receive the transaction request from the customer's mobile computing device;

wherein the communications device is also configured to receive identifying data from the customer's mobile computing device;

the customer's mobile computing device including a camera therein, and the camera being used by the customer to generate a picture;

wherein the identifying data comprises the picture taken with the camera on the mobile computing device; and the identifying data further comprises an arrangement of apps in a group of apps displayed across multiple different screens of the mobile computing device, the arrangement being descriptive of a location of each of the apps in the group of apps on a display of the customer's mobile computing device and which of the multiple different screens each of the apps in the group of apps are located;

wherein the authentication server housed at the financial institution comprises a historical database containing previously stored historical identification data relating to the customer's mobile computing device;

wherein the communications device is configured to transmit the transaction request and the identifying data to the authentication server at the financial institution;

wherein the authentication server also comprises a rules database populated with rules associated with an account associated with the customer at the financial institution;

wherein the authentication server also comprises analyzer software code blocks containing a plurality of algorithms for analyzing the identifying data received from the customer's mobile computing device, and comparing that identifying data to the stored historical data in the historical database;

wherein the analyzer software code blocks are configured to apply the rules associated with the account associated with the customer in the rules database on the authentication server when comparing the identifying data to the historical data to determine whether the transaction request should be approved or denied;

wherein upon determining that the transaction request should be approved, the authentication server is configured to output an approval allowing the financial institution to proceed with the transaction request; and wherein upon determining that the transaction request should be denied, the authentication server is configured to output a denial stopping the financial institution from taking further action with regard to the transaction request.

2. The system of claim 1, wherein the identifying data further comprises an arrangement of apps in a home group of apps among one or more apps that are installed in the mobile computing device.

3. The system of claim 1, wherein:

the analyzer software code blocks report at least one of a numerical score representative of an extent to which the received identifying data matches the stored historical data and a classification scheme representative of the extent to which the received identifying data matches the stored historical data; and the authentication server outputs an approval when the transaction request falls within a predetermined range of monetary value that is associated with one of the numerical score and the classification scheme according to the rules associated with the customer's account in the rules database.

4. The system of claim 1, wherein the arrangement of apps in the group of apps includes a first set of apps displayed in a first configuration on a home screen of the mobile computing device, a second set of apps displayed in a second configuration on a second screen of the mobile computing device, and a third set of apps displayed in a third configuration on a third screen of the mobile computing device.

5. The system of claim 1, wherein the transaction request is a request to transfer funds from an account at the financial institution.

6. The system of claim 1, wherein the identifying data further comprises a snapshot of the mobile computing device.

7. The system of claim 1, wherein the analyzer software code blocks are configured to approve transaction requests when the received identifying data is a partial match to the previously stored historical data, according to rules associated with the customer's account for partial matches.

8. A method for further authenticating a mobile computing device that initiates and submits a transaction request to an authentication server associated with a financial institution, by implementing additional measures on the authentication server comprising:

receiving the transaction request from the mobile computing device;

the mobile computing device including a camera therein, and the camera being used to generate a picture;

requesting additional identification data comprising the picture taken with the camera on the mobile computing device; and the additional identification data further comprising an arrangement of apps in a group of apps displayed across multiple different screens of the mobile computing device, the arrangement being descriptive of a location of each of the apps in the group of apps on a display of the customer's mobile computing device and which of the multiple different screens each of the apps in the group of apps are located;

receiving the additional identification data;

comparing the received additional identification data to previously stored additional identification data;

determining whether the received additional identification data is a match to the previously stored additional identification data; and approving the transaction request received from the mobile computing device if the received additional identification data is a match to the previously stored additional identification data.

9. The method of claim 8, wherein the additional identification data further comprises an arrangement of apps in a home group of apps among one or more apps that are installed in the mobile computing device.

10. The method of claim 8, further comprising determining that the received additional identification data is a partial match to the previously stored additional identification data, and checking user rules to determine whether to approve the request.

11. The method of claim 10, wherein the determination of whether to approve the request includes a calculation of an authentication score.

12. The method of claim 8, wherein the additional identification data comprises a snapshot of the mobile computing device.

13. The method of claim 12, further comprising scanning the user's mobile computing device to identify user-specific information, downloading the user-specific information and selecting at least some of the user-specific information as the stored additional identification data.

14. The method of claim 8, wherein the arrangement of apps in the group of apps includes a first set of apps displayed in a first configuration on a home screen of the mobile computing device, a second set of apps displayed in a second configuration on a second screen of the mobile computing device, and a third set of apps displayed in a third configuration on a third screen of the mobile computing device.

15. A mobile computing device comprising:

a financial institution app associated with a financial institution, in electronic communication with a remote authentication server associated with the financial institution;

additional apps displayed in a particular configuration on a display of the computing device;

the display including a group of apps on the computing device;

wherein the financial institution app is configured to initiate a transaction request relating to an account at the financial institution associated with the user;

wherein the financial institution app is configured to transmit data relating to the picture taken with the camera on the mobile computing device;

wherein the financial institution app is further configured to also transmit data relating to an arrangement of apps in a group of apps displayed across multiple different screens of the mobile computing device, the arrangement being descriptive of a location of each of the apps in the group of apps on a display of the customer's mobile computing device and which of the multiple different screens each of the apps in the group of apps are located;

the data transmitted by the financial institution app being transmitted to the authentication server at the financial institution in conjunction with the transaction request relating to the account at the financial institution associated with the user.

16. The mobile computing device of claim 15, wherein the transmitted data further comprises an arrangement of apps in a home group of apps among one or more apps that are installed in the mobile computing device.

17. The mobile computing device of claim 15, wherein the transmitted data comprises a snapshot of the mobile computing device.

18. The mobile computing device of claim 15, wherein the financial institution app is configured to allow the authentication server at the financial institution to scan the mobile computing device and identify data containing user-specific information to transmit as the transmitted data, and download the data containing the user-specific information to the authentication server.

19. The mobile computing device of claim 18, wherein the data containing user-specific information further comprises an arrangement of apps in a home group of apps among one or more apps that are installed in the mobile computing device.

20. The mobile computing device of claim 15, wherein the transaction request is a request to transfer funds.

\* \* \* \* \*